April 16, 1935.  A. J. FISHER  1,998,126
VEHICLE BODY VENTILATION
Original Filed March 17, 1933   2 Sheets-Sheet 1
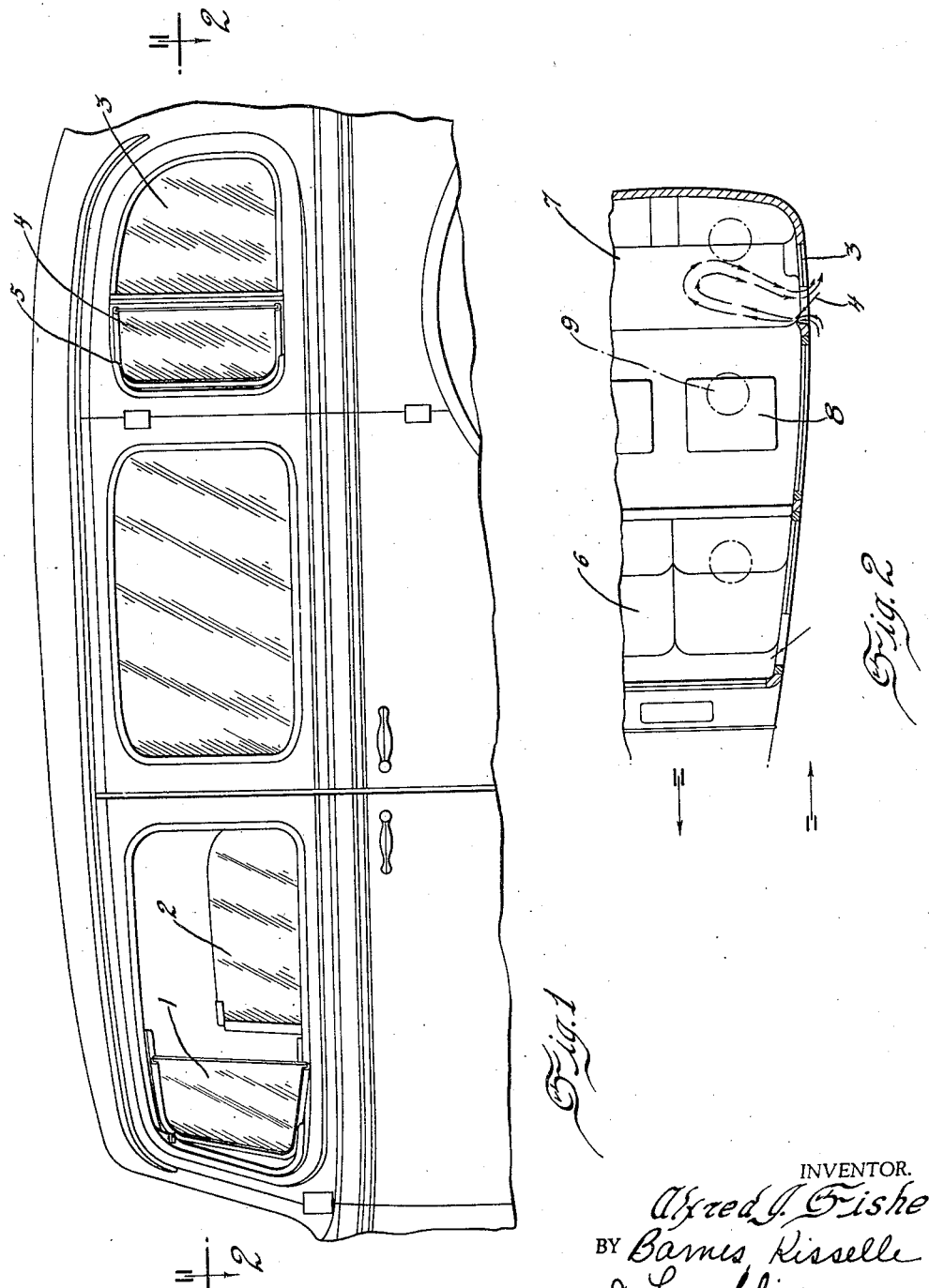

April 16, 1935.  A. J. FISHER  1,998,126
VEHICLE BODY VENTILATION
Original Filed March 17, 1933    2 Sheets-Sheet 2
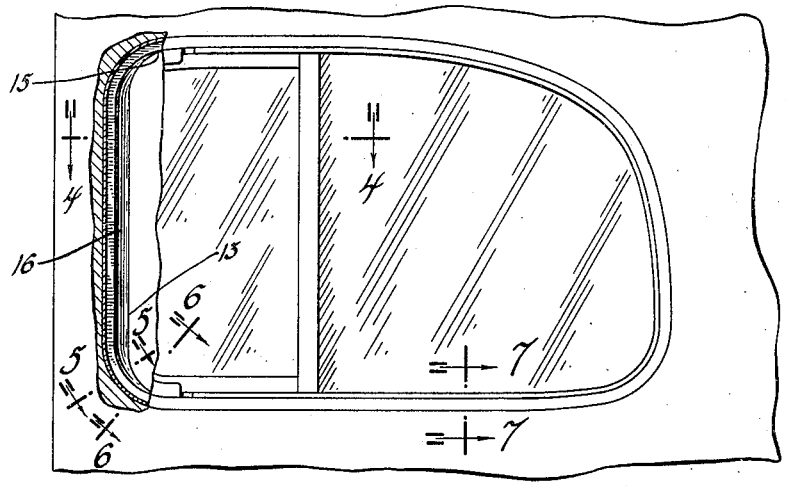
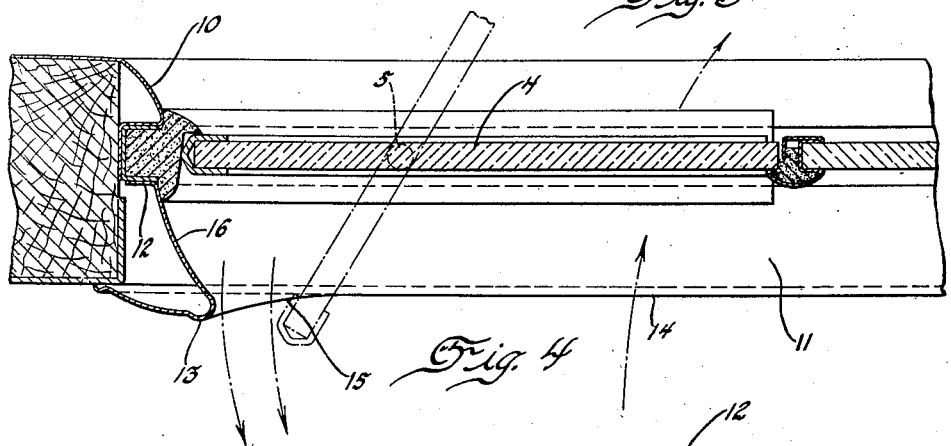
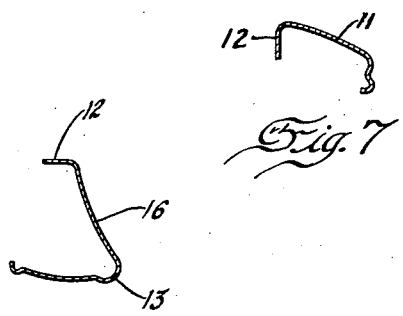
INVENTOR.
Alfred J. Fisher
BY Barnes, Kisselle
& Laughlin
ATTORNEYS Patented Apr. 16, 1935

1,998,126

UNITED STATES PATENT OFFICE 1,998,126

VEHICLE BODY VENTILATION

Alfred J. Fisher, Detroit, Mich., assignor to Ternstedt Manufacturing Company, Detroit, Mich., a corporation of Michigan Application March 17, 1933, Serial No. 661,248
Renewed January 28, 1935

9 Claims. (Cl. 296—44)

This invention relates to vehicle body ventilation, and more particularly to that type of vehicle body in which the ventilation is effected through a window assembly having a pivoted panel. In this type of body ventilation where the swinging glass panel pivots about an up and down axis between the upright edges of the glass, it has been found that when the portion of the glass to the rear of the pivot is swung outwardly and the portion of the glass to the front of the pivots is swung inwardly, that the air enters the body through the window opening in front of the axis and is drawn out of the body through the window opening to the rear of the axis thus causing the air to travel in a loop.

When the pivoted panel is a part of the rear quarter window and a seat is positioned slightly forward of the swinging panel, such as the folding seat of a seven passenger sedan, or when, as in coaches, coupés, five passenger sedans and other forms of vehicle bodies, the pivoted panel is somewhat or slightly to the rear of the front seat, the air currents flowing into the body through that portion of the window opening forward of the axis of the pivoted panel strike the passenger, in any of the aforementioned seats, on the back of the neck much to his discomfort. It is the object of this invention to obviate this uncomfortable draft on such a passenger. This object has been accomplished by projecting inwardly of the body the portion of the window frame which defines the window opening forward of the pivots to serve as a baffle for directing the air currents away from the aforementioned seat.

This invention also contemplates a garnish molding for a window assembly including a panel arranged to swing about an up and down axis between the upright edges of the panel wherein the portion of the garnish molding forward of the axis of the swinging panel is projected inwardly of the body and preferably dished rearwardly from its outer to its inner edge to serve as a deflector for the air flowing into the body through the opening forward of the axis to shield the passenger adjacent and forwardly of the pivoted panel.

In the drawings:

Fig. 1 is a side elevation of a vehicle body wherein the body ventilation is effected through the windows.

Fig. 2 is a diagrammatic plan view of a portion of a seven passenger vehicle body incorporating the dished baffle form of garnish molding.

Fig. 3 is a side elevation of a vehicle window as viewed from the outside of the body, parts of which are broken away to show the dished baffle form of garnish molding.

Fig. 4 is a section along the line 4—4 of Fig. 3.

Figs. 5, 6 and 7 are sections of the garnish molding taken along lines 5—5, 6—6, 7—7, respectively of Fig. 3.

In the drawings there is shown a body in which is incorporated an individually controlled ventilation system. This individually controlled ventilation system briefly consists of a front window assembly comprising a swinging panel 1 which swings upon pivots at the top and bottom edges between its front and rear upright edges and a vertically slidable panel 2, and also a rear quarter window assembly having a fixed panel 3 and a swingable pan 1 4 which swings upon pivots 5 at the top and bot m edges between its front and rear upright edges.

The specific vehicle body shown is a seven passenger body having the front seat 6, rear seat 7, and the folding seats 8. The position of the head of the passenger in each of the seats is diagrammatically illustrated by the circles 9. Referring to Figure 2, it will be noted that the folding seat 8 is positioned adjacent and somewhat forwardly of the rear quarter pivoted panel 4.

It is customary in vehicle bodies to define the outside periphery of the window opening with a reveal such as at 10 and the inside periphery by a garnish molding but it is specifically understood that the term "window frame" as hereinafter used is not limited specifically to a reveal and garnish molding but includes any member or portion of the vehicle body which defines the periphery of the window opening. Figure 7 shows a conventional form of garnish molding 11 which surrounds the interior of the window opening to the rear of the pivots 5. With this type of conventional garnish molding completely surrounding the window opening it has been found that when the pivoted panel 4 is swung to the position shown in Figs. 1 and 2, that the inflowing air current portion of the loop set up by the pivoted panel 4 travels inwardly and somewhat forwardly in the body thus striking the passenger 9 in the folding seat 8 on the back of the neck causing discomfort. To obviate this difficulty it is proposed, instead of continuing the garnish molding of the conventional form about that portion of the window opening forward of the pivots of the pivoted panel to fabricate this portion of the window frame in the form of a baffle for the inflowing air currents. If this portion of the window frame, which is here shown by way of example only in the form of a garnish molding, is extended beyond the normal inner edge of the molding to the rear of the pivots then the inflowing portion of the air loop is deflected from the passenger. In addition to assure still better results the inner edge of this portion of the garnish molding may be dished rearwardly from its outer to its inner edge so that the outer edge is forward of the inner edge. To this end, by way of example, it will be noted that the portion of the garnish molding forward of the pivots 5 of the pivoted panel is dished rearwardly of the body from its outer edge 12 to its inner edge 13 so that the inner edge is in rear of the outer edge. Also, this portion of the molding forward of the pivots is extended inwardly of the body so that its inner edge 13 projects inwardly beyond the normal inner edge 14 of the garnish molding to the rear of the pivots.

It will be noted that the inner edge 13 of that portion of the garnish molding forward of the pivots 5 of the swinging panel 4 begins to flare inwardly of the body at 15 beyond the normal inner edge 14 of the garnish molding and reaches its maximum flare along the vertical portion of the garnish molding. Further, the face 16 of that portion of the garnish molding forward of the pivots curves rearwardly of the body from its outer edge 12 to its inner edge 13. Preferably the surface curve of the face 16 of the vertical portion of the garnish molding is concentric with the axis of the pivoted panel 4. With the window frame forward of the pivots thus formed, it has been found that the inflowing portion of the air current loop will be flattened out and directed laterally and backwardly of the body (see arrows of Fig. 2) rather than angularly forward thus preventing the inflowing portion of the air current loop from striking the occupant of seat 8 in the back of the neck.

The general arrangement of swinging and sliding panels shown is not claimed in this application. It has been made the subject matter of a separate application, Serial No. 644,622, filed November 28, 1932.

I claim:

1. A window assembly for a vehicle body comprising in combination a frame defining the window opening, a window panel pivoted to swing about an up and down axis between its rear and forward edges, a portion of the frame adjacent the front edge of the swinging panel being inclined rearwardly of the body from its outer edge to its inner edge to direct air entering at this point rearwardly.

2. A window assembly for a vehicle body comprising in combination a window panel pivoted at its top and bottom edges somewhat to the rear of its forward edge, and a garnish molding defining the periphery of the window opening forward of the pivots, a portion of the garnish molding forward of the pivots being inclined rearwardly of the body from its outer edge to its inner edge.

3. A window assembly for a vehicle body comprising in combination a window panel pivoted at its top and bottom edges between its front and rear edges, a garnish molding defining the inner periphery of the window opening, a portion of the garnish molding forward of the said pivots being inclined rearwardly from its outer edge to its inner edge, and the inner edge of the inclined portion extended inwardly beyond the normal inner edge of the portion of the molding to the rear of the pivots.

4. A window assembly for a vehicle body comprising in combination a panel pivoted at its top and bottom edges between its rear and front edges to swing about an up and down axis, a garnish molding defining the inner periphery of the window opening forward of the said pivots, the portion of the garnish molding adjacent the forward edge of the said panel being curved rearwardly from its outer edge to its inner edge concentric with the axis of the said pivoted panel.

5. In a vehicle body, a window assembly having a panel swingable on an up and down axis between its rear and front edges, and a window frame having a portion forward of the axis of the swinging panel inclined rearwardly for deflecting from the adjacent seat the air currents flowing into the body forward of the pivots of the pivoted panel from a seat adjacent and just forward of the front edge of the swinging panel.

6. A window assembly for a vehicle body comprising in combination a frame defining a window opening, a window panel pivoted to swing about an up and down axis between its rear and forward edges, a portion of the frame adjacent the front edge of the swinging panel having a portion projecting inwardly and rearwardly of the body beyond the normal inner edge of the window opening to serve as an air deflector.

7. A window assembly for a vehicle body comprising in combination a window opening, a panel pivoted at its top and bottom edges somewhat to the rear of its forward edge in the window opening, and a garnish molding defining the periphery of the window opening forward of the pivots and having a portion projected inwardly and rearwardly of the body to serve as an air deflector for the inflowing air currents.

8. A window assembly for a vehicle body comprising in combination with a body, a frame defining a window opening, a window panel pivoted to swing about an up and down axis between its rear and forward edge, a portion of the frame adjacent the front edge of the swinging panel having a portion projecting inwardly of the inside wall of the body beyond the normal inner edge of the window opening to serve as an air baffle and deflector for intercepting air tending to travel forward as it is drawn into the interior of the body through the opening at the front of the panel when the vehicle is in motion and the panel is open part-way.

9. A window assembly for a vehicle body having in combination with the body, a window opening, a panel pivoted in the window opening intermediate its front and rear edges and garnish molding defining the front of said opening and having a portion projecting inwardly of the body beyond the normal inner edge of the window opening to serve as a deflector for air currents that tend to travel forward when air is drawn in at the front of the pivoted panel when the vehicle is in motion and the panel is open part-way.

ALFRED J. FISHER.